(12) United States Patent
Yoo et al.

(10) Patent No.: US 8,926,187 B2
(45) Date of Patent: Jan. 6, 2015

(54) ELASTIC RING BEARING

(75) Inventors: Haw-Yale Yoo, Incheon (KR); Yun-Cheol Hwang, Incheon (KR)

(73) Assignee: Smartcaster Co., Ltd., Incheon (KR)

( * ) Notice: Subject to any disclaimer, the term of this patent is extended or adjusted under 35 U.S.C. 154(b) by 22 days.

(21) Appl. No.: 13/817,028

(22) PCT Filed: Aug. 9, 2011

(86) PCT No.: PCT/KR2011/005802
§ 371 (c)(1),
(2), (4) Date: Feb. 14, 2013

(87) PCT Pub. No.: WO2012/033286
PCT Pub. Date: Mar. 15, 2012

(65) Prior Publication Data
US 2013/0142470 A1    Jun. 6, 2013

(30) Foreign Application Priority Data

Sep. 10, 2010  (KR) .................... 10-2010-0088779
Mar. 28, 2011  (KR) .................... 10-2011-0027692

(51) Int. Cl.
| F16C 33/60 | (2006.01) |
| F16C 27/04 | (2006.01) |
| F16C 33/30 | (2006.01) |
| F16C 19/06 | (2006.01) |
| F16C 19/18 | (2006.01) |

(52) U.S. Cl.
CPC ............... *F16C 27/04* (2013.01); *F16C 33/30* (2013.01); *F16C 33/60* (2013.01); *F16C 19/06* (2013.01); *F16C 2300/02* (2013.01); *F16C 19/181* (2013.01); *F16C 2226/60* (2013.01)

USPC ............ 384/513; 384/501; 384/538; 384/539

(58) Field of Classification Search
USPC ......... 384/513, 445, 456, 490, 499–502, 537, 384/539
See application file for complete search history.

(56) References Cited

U.S. PATENT DOCUMENTS

| 1,305,131 | A | * | 5/1919 | Leon ............................. 384/535 |
| 1,965,293 | A | * | 7/1934 | Ljungstrom .................. 384/535 |
| 3,640,591 | A | * | 2/1972 | Eklund ......................... 384/493 |
| 6,309,109 | B1 | * | 10/2001 | Chuang ........................ 384/537 |

FOREIGN PATENT DOCUMENTS

| JP | 51-021048 U | 2/1976 |
| JP | 56-003318 A | 1/1981 |
| JP | 61-166229 U | 10/1986 |
| JP | 2008-208976 A | 9/2008 |
| KR | 10-2007-0035034 A | 3/2007 |

* cited by examiner

*Primary Examiner* — Thomas R. Hannon
(74) *Attorney, Agent, or Firm* — Rabin & Berdo, P.C.

(57) ABSTRACT

A bearing comprises an inner wheel, an outer wheel which includes a first outer wheel and a second outer wheel, a plurality of rolling elements which are disposed between the inner wheel and the outer wheel, an inner wheel elastic ring which is disposed between the inner wheel and the a plurality of rolling elements and an outer wheel elastic ring which is disposed between the outer wheel and the a plurality of rolling elements. The bearing also comprises a first boss part which is disposed on an outer portion of the first outer wheel and has a plurality of fixing holes, and a second boss part which is disposed on an outer edge portion of the second wheel and has a plurality of hook parts, where the plurality of hook parts are inserted into the plurality of fixing holes.

20 Claims, 10 Drawing Sheets

ELASTIC RING BEARING

TECHNICAL FIELD

The present invention relates to an elastic ring bearing, and in particular to an elastic ring bearing which makes it possible to uniformly distribute a load applied to a bearing during rotations by inserting an elastic ring into a bearing generally used for various industrial equipments and a vehicle for thereby reducing noises and vibrations when in operations and enhancing durability.

BACKGROUND ART

Generally speaking, a bearing is a mechanical part which helps fix a rotating shaft of a machine in place and support the self weight of a shaft and the load applied to the shaft for thereby smoothly rotating the shaft. The above is mentioned bearing is widely used in a variety of machines which are designed to rotate.

The above mentioned bearing may be classified into a rolling bearing, a plane bearing, a fluid bearing, a magnetic beating, a sleeve beating, etc, among which the rolling beating is designed to contact as a steel ball or a roller rolls, so it generally is used in an element which rotates at a high speed thanks to its less friction.

It is advantageous that the rolling bearing has less friction resistance for the shaft comes into contact with the ball or roller of the beating and rotates and the ball or roller rotates together, so it has better heat resistance and durability as compared to other bearings, which features make it possible to be used more; however it has disadvantage in that the noises and vibrations are high when in operations.

In order to improve the above mentioned problems, the Korean Patent Publication No. 10-2007-0035034 discloses an apparatus for reducing vibrations of bearing. As shown in FIG. 1, it comprises a housing 15 with a mounting hole having a diameter greater than the diameter of a bearing, and a thin flat plate 17 with a plurality of slits 21. The bearing fits the mounting hole for the bearing not to escape in the axial direction. A circular gap is formed at the outer circumference of the bearing for the same to move in the radius direction. At the circular gap is disposed the thin flat plate 17 for the apparatus to be movable in the circumferential direction. The portion of the thin flat plate 21 inserted in the slit 21 is made with an elastic beam 22. When it comes into contact with the bearing, the bearing is elastically supported for thereby reducing vibrations.

The above described conventional art has disadvantages in that the construction seems complicated, and the manufacture costs a lot, much time is required. For a vibration reduction element is required at an outer side of the bearing, the effects are not good, and it is hard to achieve a load distribution effect in the interior of the bearing.

DISCLOSURE OF INVENTION

Accordingly, the present invention is invented to improve the above mentioned problems. It is an object of the present invention to provide an elastic ring bearing which makes it possible to distribute load applied to the beating to during rotations in such a way to insert an elastically movable ring at an inner side of the bearing.

It is another object of the present invention to provide an elastic ring bearing which makes it possible to reduce noises occurring when in operations by distributing load applied to a bearing and to reduce vibrations for thereby is reducing the abrasions of rolling elements.

It is further another object of the present invention to provide an elastic ring bearing which can be applied to various fields in such a way that an outer wheel and an inner wheel, an outer wheel and an elastic ring are provided in multiple numbers in parallel structures for thereby distributing greater loads.

To achieve the above objects, there is provided an elastic ring bearing in a bearing comprising an inner wheel, an outer wheel and a rolling element inserted into between the inner wheel and the outer wheel, comprising an outer wheel elastic ring which is disposed between the outer wheel and the rolling element.

At this time, the outer wheel is formed of a first outer wheel and a second outer wheel, and the outer wheel elastic ring is installed between the first and second outer wheels.

In addition, a space part is formed between the outer wheel elastic ring and the first and second outer wheel.

In addition, an engaging groove into which the outer wheel elastic ring is inserted is formed at the first and second outer wheels, and an escape prevention shoulder is protruded from one side of the engaging groove.

In addition, a first boss part formed of a plurality of fixing holes is is formed at an outer edge portion of the first outer wheel, and a second boss part formed of a plurality of hook parts inserted into the fixing hole is protruded from an outer edge portion of the second wheel.

At this time, the fixing hole has a diameter which gradually increases toward the inner side.

In addition, there is further provided a first engaging means which is inserted and engaged passing through the fixing hole and the hook part for thereby securing the first and second outer wheels.

To achieve the above objects, there is provided an elastic ring bearing in a bearing comprising an inner wheel, an outer wheel and a rolling element inserted into between the inner wheel and the outer wheel, comprising an inner wheel elastic ring which is disposed between the inner wheel and the rolling element.

At this time, the inner wheel is formed of a first inner wheel and a second inner wheel, and the inner wheel elastic ring is installed between the first and second inner wheels.

To achieve the above objects, there is provided an elastic ring bearing in a bearing comprising an inner wheel, an outer wheel and a rolling element inserted into between the inner wheel and the outer wheel, comprising the inner wheel, the outer wheel and the rolling element which each are provided in multiple numbers and are connected in parallel, and an inner wheel elastic ring is secured between the inner wheel and the rolling element.

To achieve the above objects, there is provided an elastic ring bearing in a bearing comprising an inner wheel, an outer wheel and a rolling element inserted into between the inner wheel and the outer wheel, comprising the inner wheel, the outer wheel and the rolling element which each are provided in multiple numbers and are connected in parallel, and an outer wheel elastic ring is secured between the outer wheel and the rolling element.

To achieve the above objects, there is provided an elastic ring bearing, comprising a plurality of inner wheels which are arranged in parallel; a support part into which the inner wheel is inserted and engaged; a plurality of rolling elements which are secured to the outer sides of the inner wheels; an inner wheel elastic ring which are inserted between the inner wheel and the rolling element while being positioned among a plurality of the inner wheels; a to plurality of outer wheels which are secured to the outer sides of the rolling elements; and a fixing part which is secured at an outer side of the outer wheel for thereby fixing the outer wheel.

At this time, a first shoulder is formed at the upper and lower surfaces of an outer side of the inner wheel and is inserted into an inner side of the inner wheel elastic ring, and a first engaging groove into which the first shoulder is inserted is formed at the upper and lower surfaces of the inner wheel elastic ring.

In addition, a first mounting groove is formed at an outer surface of the inner wheel elastic ring for mounting the rolling element.

In addition, a first space part is formed between the inner wheel and the inner wheel elastic ring.

To achieve the above objects, there is provided an elastic ring bearing, comprising a plurality of inner wheels which are arranged in parallel; a support part into which the inner wheel is inserted and engaged; a plurality of rolling elements which are secured to the outer sides of the inner wheels; a plurality of outer wheels which are secured to the outer sides of the rolling elements; an outer wheel elastic ring which are inserted between the rolling element and the outer wheel while being positioned among a plurality of the outer wheels; and a fixing part which is secured at an outer side of the outer wheel for thereby fixing the outer wheel.

At this time, a second shoulder is formed at the upper and lower surfaces of an outer side of the outer wheel, and a second engaging groove is formed at the upper and lower surfaces of the outer wheel elastic ring and is engaged to the second shoulder.

In addition, a second mounting groove in which the rolling element is mounted is formed at an inner surface of the outer wheel elastic ring.

In addition, a second space part is formed between the outer wheel and the outer wheel elastic ring.

In addition, the support part comprises a center shaft onto which an inner wheel is inserted and engaged; a first escape prevention cap which is engaged at both ends of the center shaft for preventing the escape of the inner wheel; and a first fixing cap securing the first escape prevention cap to the center shaft.

At this time, a plurality of slits are formed at both ends of the center shaft.

In addition, the fixing part comprises a ring shaped support member which is engaged to an outer side of the outer wheel; a second escape prevention cap which is engaged to both ends of the support member for thereby preventing the escape of the outer wheel; and a second fixing cap fixing the second escape prevention cap.

In addition, an engaging groove is formed on an outer circumferential surface of the support member, and a protrusion part secured to the engaging groove is formed at an inner surface of the second escape prevention cap.

Advantageous Effects

According to the present invention, it is advantageous to distribute load applied to a bearing during rotations by providing a simple construction in such a way to insert an elastically operable ring at an inner side the bearing.

In addition, the noise occurring when in operation can be reduced with the aid of the distribution of load applied to a bearing, and vibrations can be accordingly reduced, and the abrasion of the rolling elements can be prevented for thereby enhancing the durability of the bearing.

BEST MODES FOR CARRYING OUT THE INVENTION

The preferred embodiment of an elastic ring bearing according to the present invention will be described with reference to the accompanying is drawings.

Figure 1:
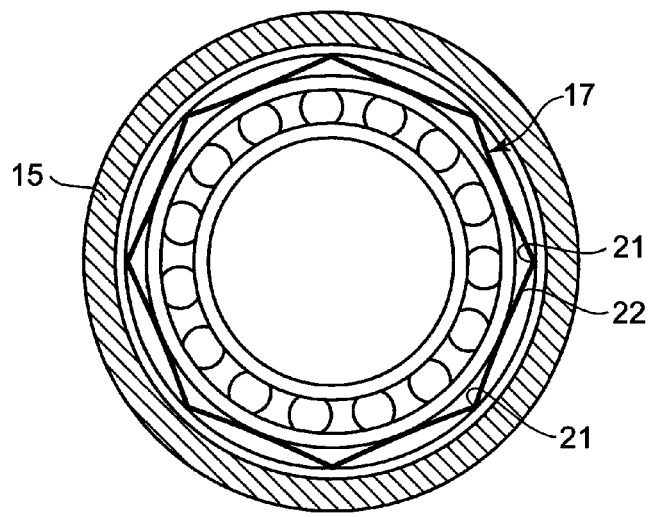
FIG. 1 is a plane view illustrating a conventional bearing vibration reduction apparatus.
Figure 2:
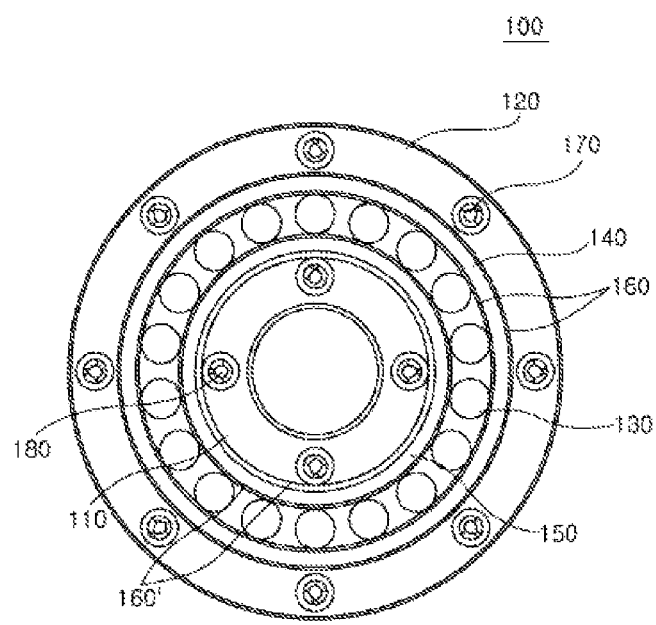
FIG. 2 is a plane view illustrating an elastic ring bearing according to the present invention.
Figure 3:
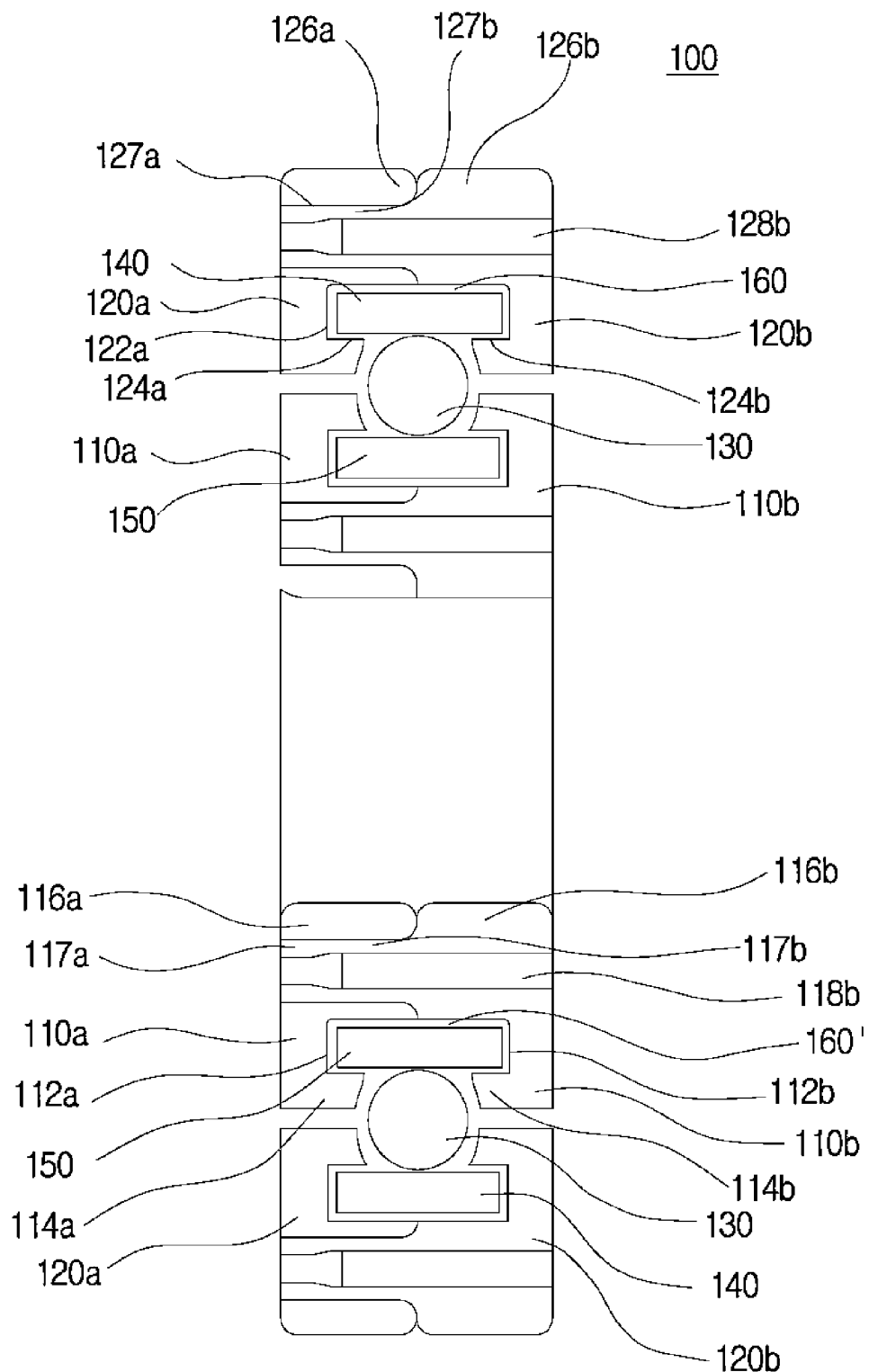
FIG. 3 is a side cross sectional view illustrating an elastic ring bearing according to the present invention.
Figure 4:
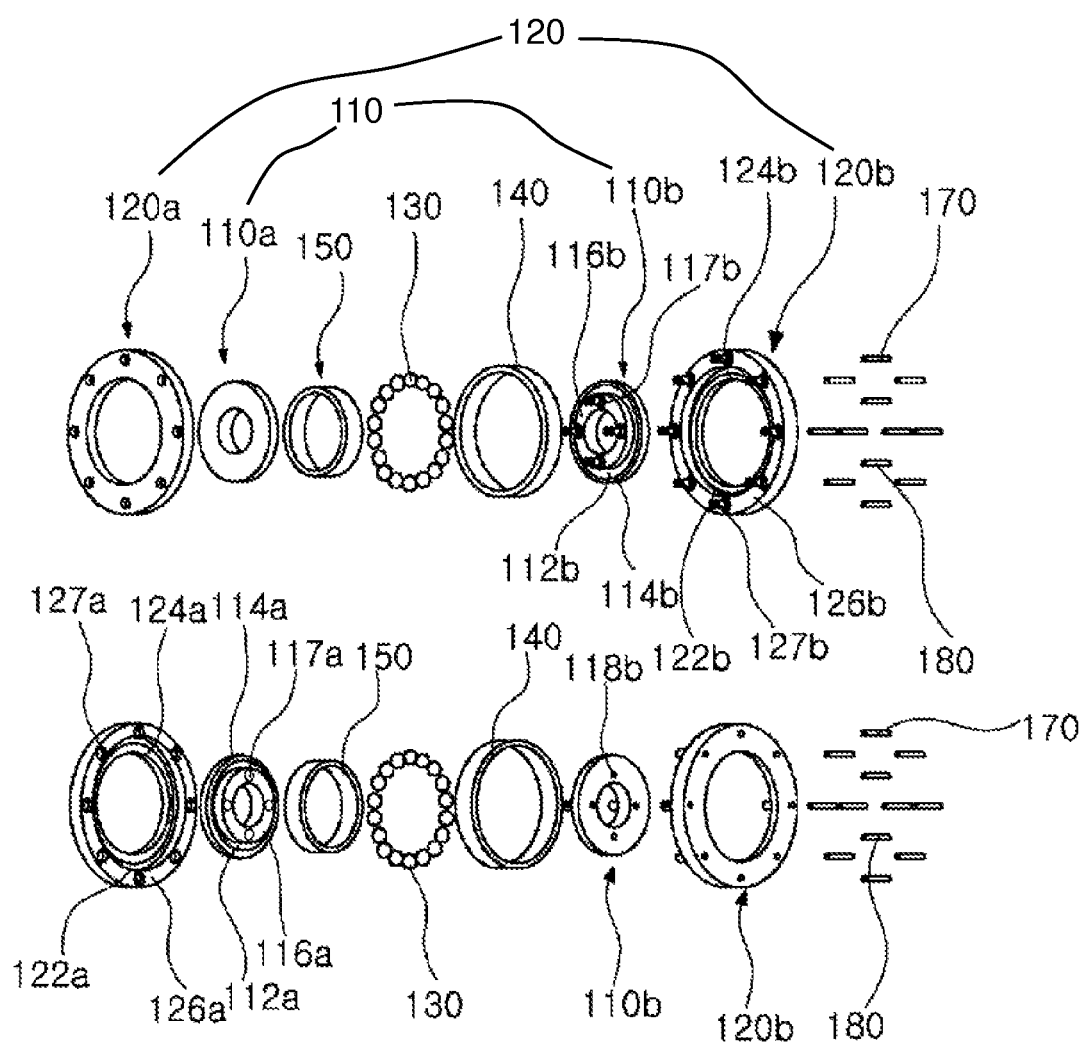
FIG. 4 is a separated respective view illustrating an elastic ring bearing according to the present invention.
Figure 5:
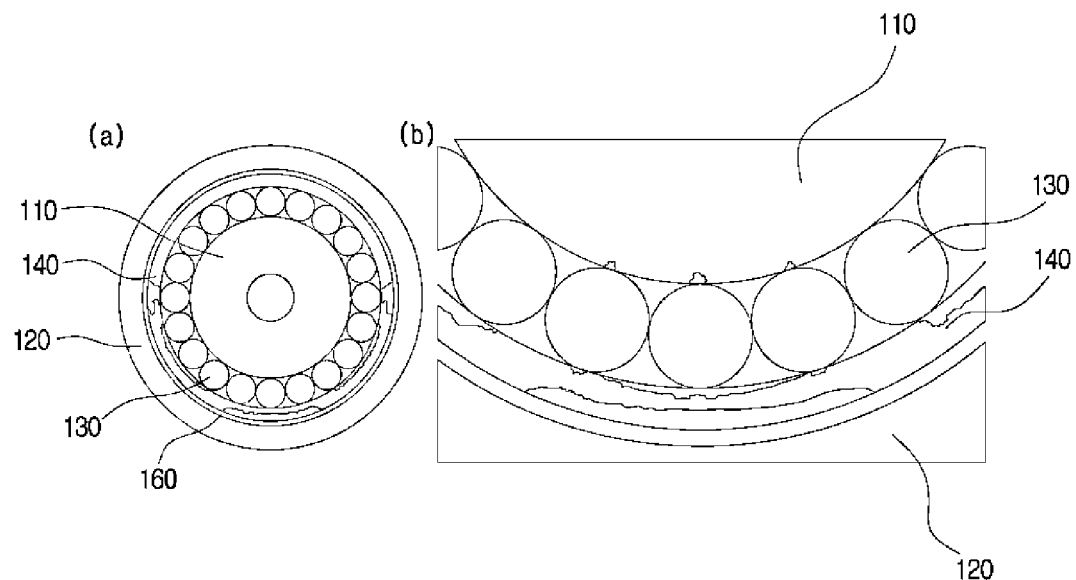
FIGS. 5 and 6A and 6B are views illustrating results of the tests on is a load distribution of an elastic ring bearing of the present invention and a conventional bearing.
Figure 6:
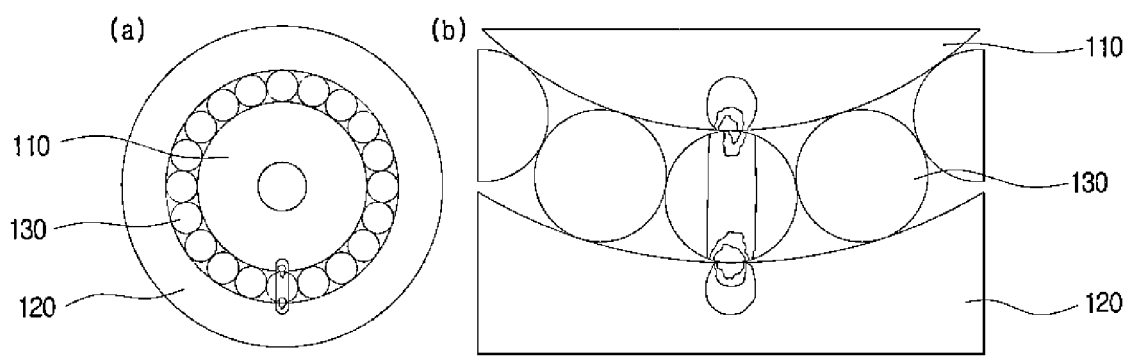
Figure 7:
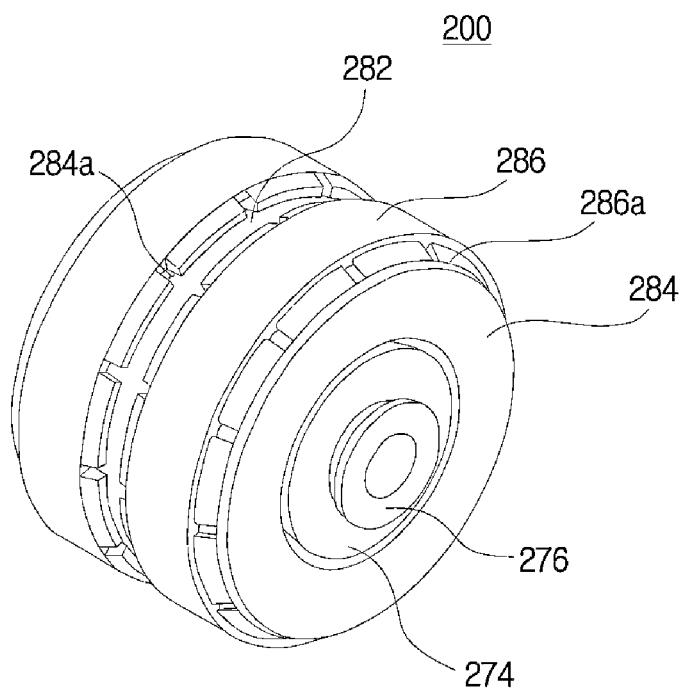
FIG. 7 is a perspective view illustrating an elastic ring bearing according to another embodiment of the present invention.
Figure 8:
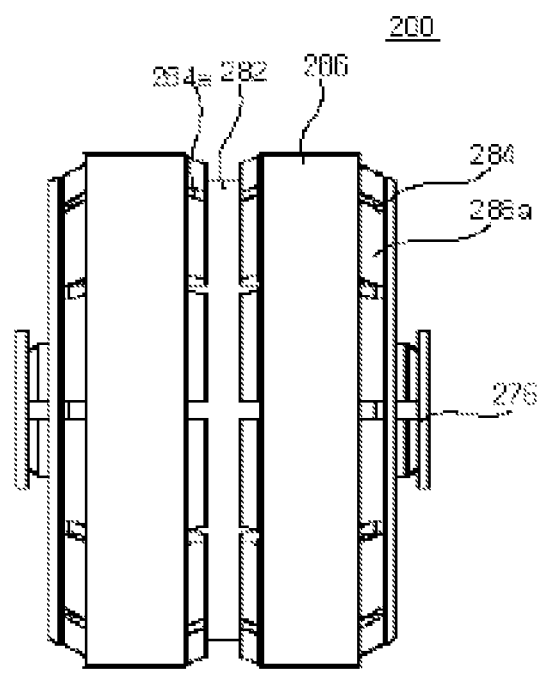
FIG. 8 is a side view of FIG. 7 of the present invention.
Figure 9:
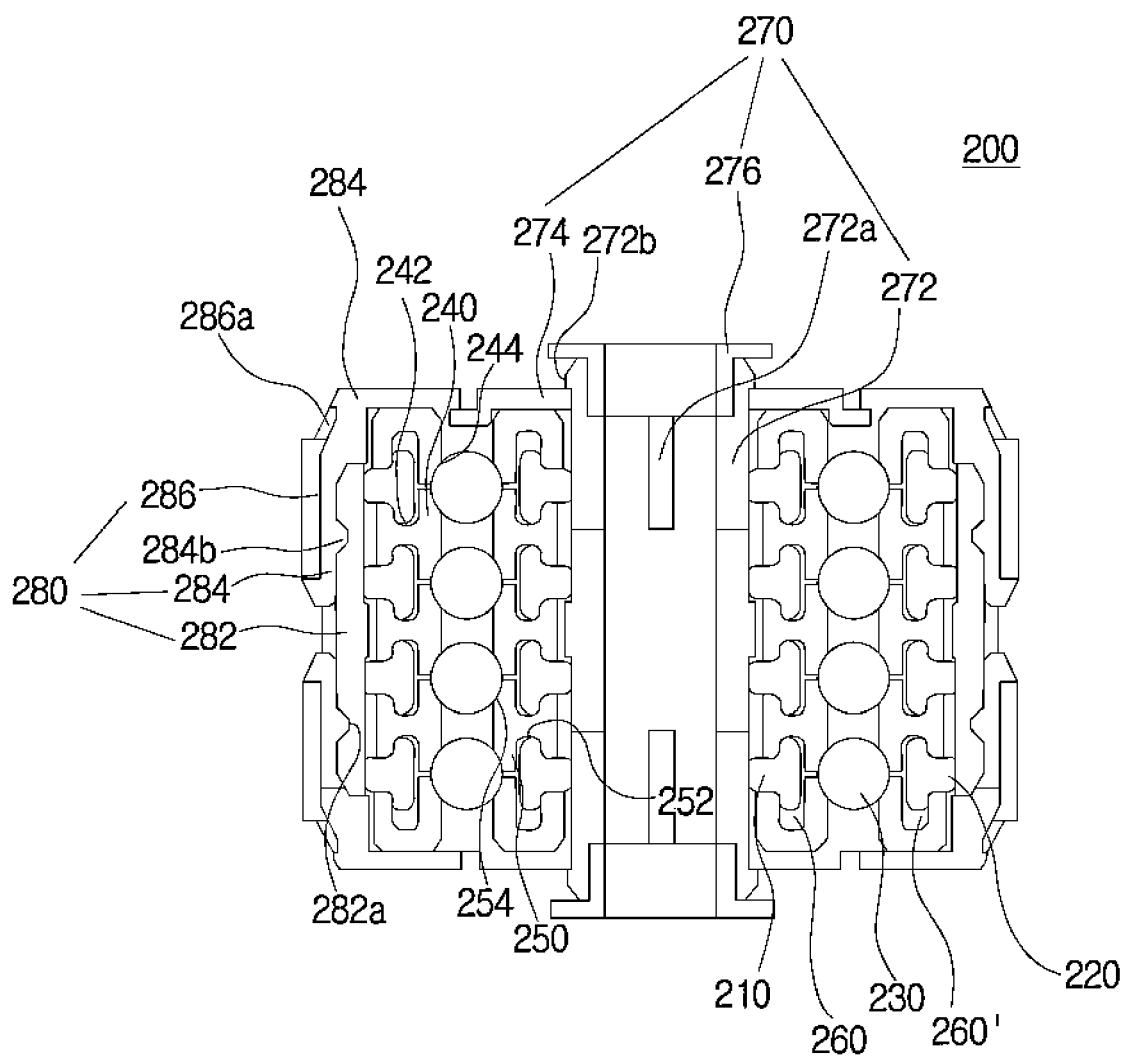
FIG. 9 is a side cross sectional view of FIG. 7 of the present invention.
Figure 10:
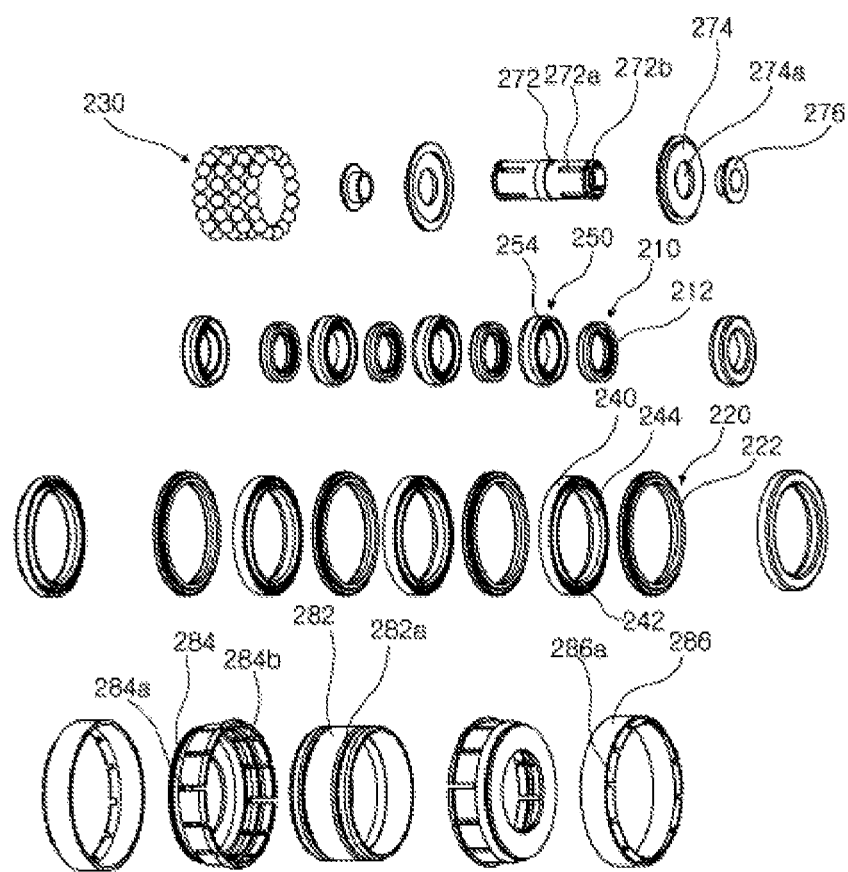
FIG. 10 is a separated perspective view of FIG. 7 of the present invention.
Figure 11:
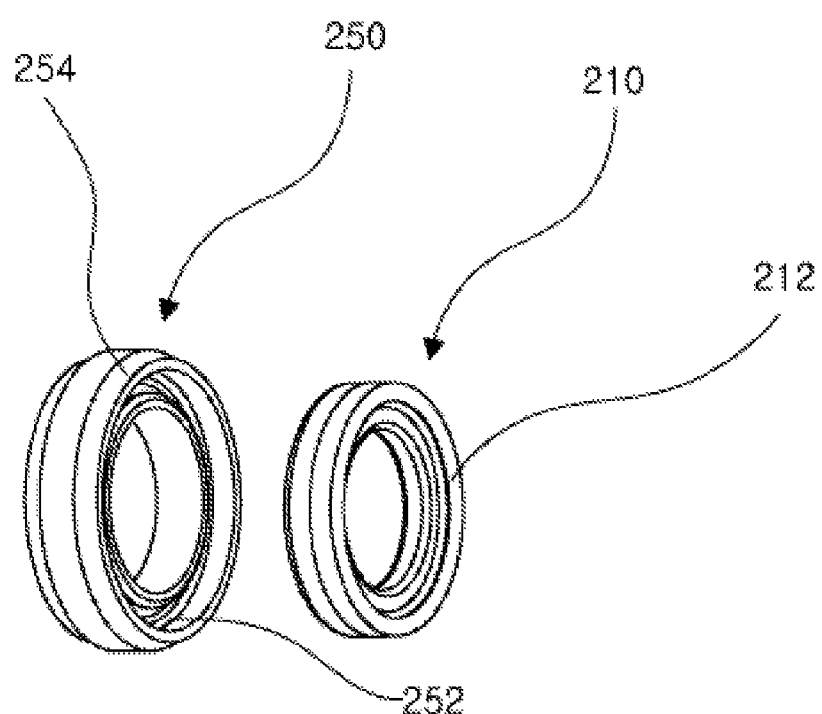
FIG. 11 is a detailed view illustrating an inner wheel and an inner wheel elastic ring of FIG. 10 of the present invention.
Figure 12:
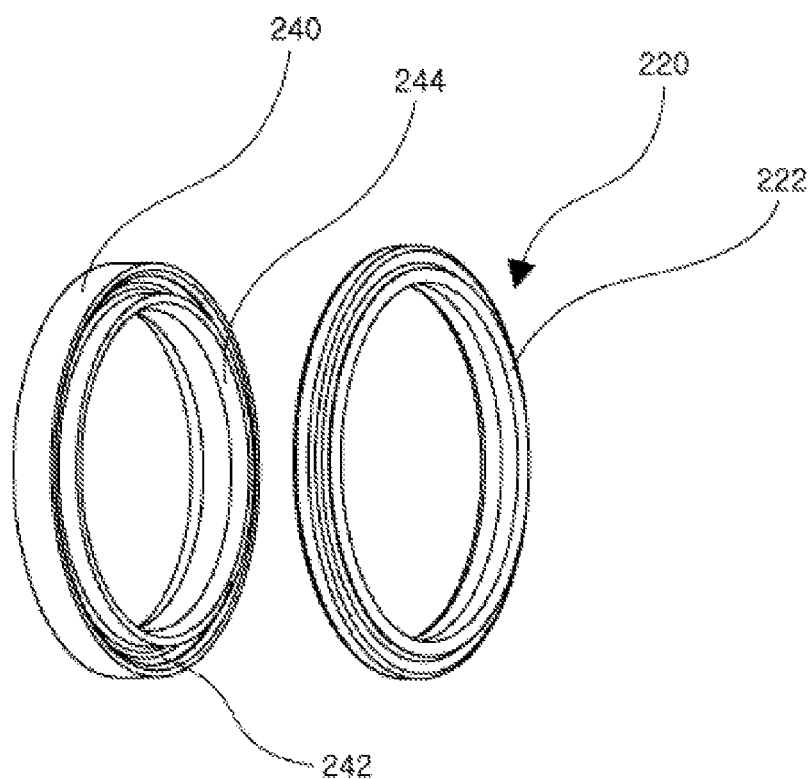
FIG. 12 is a detailed view illustrating an outer wheel and an outer wheel elastic ring of FIG. 10 of the present invention.
Figure 13:
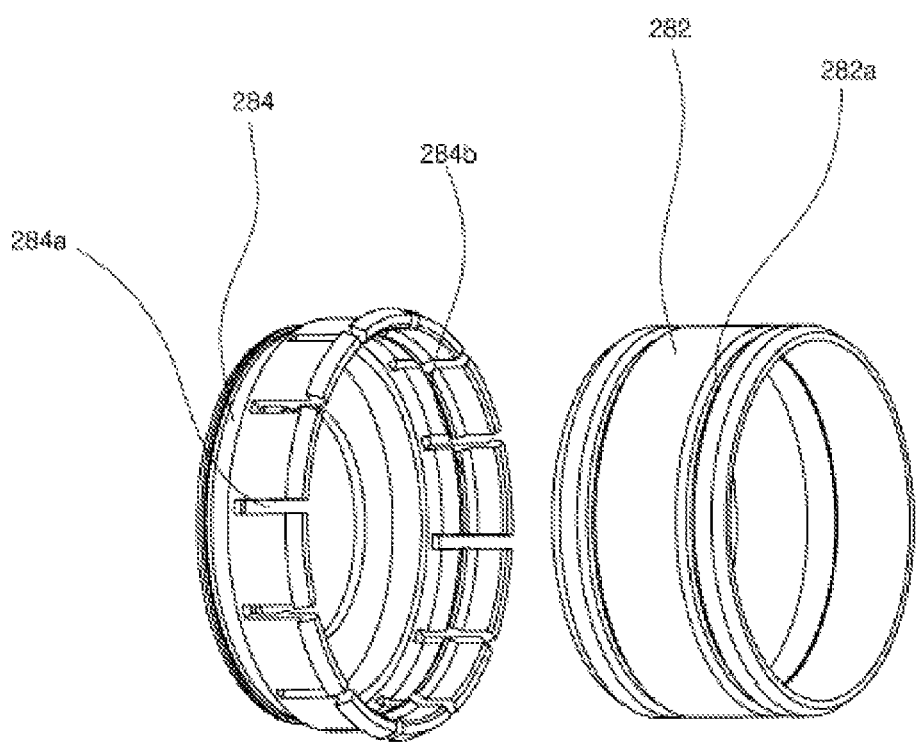
FIG. 13 is a detailed view illustrating a support member and a second escape prevention cap of FIG. 10 of the present invention.

FIG. 2 is a plane view illustrating an elastic ring bearing according to the present invention. FIG. 3 is a side cross sectional view illustrating an elastic ring bearing according to the present invention. FIG. 4 is a separated respective view illustrating an elastic ring bearing according to the present invention. FIGS. 5 and 6A and 6B are views illustrating results of the tests on a load distribution of an elastic ring bearing of the present invention and a conventional bearing. FIG. 7 is a perspective view illustrating an elastic ring bearing according to another embodiment of the present invention. FIG. 8 is a side view of FIG. 7 of the present invention. FIG. 9 is a side cross sectional view of FIG. 7 of the present invention. FIG. 10 is a separated perspective view of FIG. 7 of the present invention. FIG. 11 is a detailed view illustrating an inner wheel and an inner wheel elastic ring of FIG. 10 of the present invention. FIG. 12 is a detailed view illustrating an outer wheel and an outer wheel elastic ring of FIG. 10 of the present invention. FIG. 13 is a detailed view illustrating a support member and a second escape prevention cap of FIG. 10 of the present invention.

The present invention is directed to an elastic ring bearing 100 which has features in that an elastic ring is inserted into a bearing which is a mechanical element for the purpose of distributing loads which are applied to a is bearing during rotations, so it is possible to reduce noises and vibrations when in operation, which leads to enhancing durability. The elastic ring beating 100 comprises an inner wheel 110, an outer wheel 120, a rolling element 130, and an outer wheel elastic ring 140.

In more details, in the structure of a common bearing which comprises an inner wheel 110, an outer wheel 120 and a rolling element 130 formed of a ball or a roller disposed between the inner wheel 110 and the outer wheel 120, the present invention has features in that an outer wheel elastic ring 140 made of an elastic ring 140 is disposed between the rolling element 130 and the outer wheel 120. The outer elastic ring 140 transforms when it receives load for thereby increasing the contact area between the rolling element 130 and the inner wheel 110 thus distributing loads.

The outer wheel elastic ring 140 transforms by the load generating when in the operation of the bearing 100, so the rolling element 130 is pressurized, and thanks to the pressurizing operation, the contact area between the rolling element 130 and the inner wheel 110 increases, which helps distribute the loads, reducing the vibrations and noises.

As shown in FIGS. 3 and 4, the outer wheel 120 is formed of first and second outer wheels 120a and 120b, and an outer wheel elastic ring 140 is inserted between the first and second outer wheels 120a and 120b. A space part 160 is formed between the first and second outer wheels 120a and 20b and the outer wheel elastic ring 140 for the outer wheel elastic ring 140 to be transformed by loads.

As shown in FIG. 3, the space part 160 is formed in the upward, downward, leftward and rightward directions for the outer wheel elastic ring 140 to be transformed with respect to the loads applied in all directions including vertical and horizontal directions.

In more details, engaging grooves 122a and 122b are formed at the first and second wheels 120a and 20b, so the outer wheel elastic ring 140 is inserted into the inner sides of the engaging grooves 122a and 122b. From one side of each of the engaging grooves 122a and 122b, namely, at the inner side of each of the engaging grooves 122a and 122b is protruded each of the escape prevention shoulders 124a and 124b for thereby preventing the escape of the outer wheel elastic ring 140 inserted in each of the engaging grooves 122a and 122b.

Not shown in the drawings, a stepped portion is formed on an outer circumferential surface of the outer wheel ring 140, so the outer wheel elastic ring 140 can be more stably inserted into the inner sides of the engaging grooves 122a and 122b. At an inner side surface of the outer wheel elastic ring 140 is formed a mounting groove (not shown) for mounting the rolling element 130, so the outer wheel elastic ring 140 and the rolling element 130 come closer to each other, whereby the transformation of the outer wheel elastic ring 140 can be more reliably transferred to the rolling element 130 with the aid of external loads.

From the outer edges of the first and second outer wheels 120a and 120b are protruded first and second boss parts 126a and 126b for the purpose of preventing the escape of the outer wheel elastic ring 140. A plurality of fixing holes 127a are formed at the first boss part 126a, and from the second boss part 126b corresponding to the portion that the fixing hole 127a is formed is protruded a hook part 127b, so the hook part 127b is inserted into the inner side of the fixing hole 127a, whereby the first outer wheel 120a and the second outer wheel 120b are engaged with each other.

In addition, for the sake of a reliable engagement between the first and second outer wheels 120a and 120b, a first engaging part 170 may be used. The first engaging part 170 is an engaging pin or a bolt-nut.

At the portion that the hook part 127b of the second outer wheel 120b is formed is formed a through hole 128b passing through the second boss part 126b and the hook part 127b, and the first engaging element 170 is inserted through the through hole 128b and is engaged in the interior of the fixing hole 127a formed at the first boss part 126b of the first outer wheel 120a, so that the first and second outer wheels 120a and 120b can be reliably engaged.

The fixing hole 127a is formed in a step shape with its diameter gradually increasing from the entrance to the inner side, so the hook part 127b inserted into the fixing hole 127a can be reliably fixed.

In more details, when the fixing hole 127a is formed in a step shape with its diameter gradually increasing toward the inner side, and when the first engaging part 170 is inserted into the inner side of the hook part 127b through the through hole 128b in a state that the hook part 127b of the second outer wheel 120b is inserted into the fixing hole 127a, the first engaging part 170 allows the hook part 127b to widen outwards and to be inserted, so the front end of the hook part 127b is caught by at the inner side of the fixing hole 127a formed in a step shape, whereby the first and second outer wheels 120a and 120b can be reliably engaged with each other.

In the elastic ring bearing 100 according to another embodiment of the present invention, an inner wheel elastic ring 150 made of an elastic material may be inserted between the inner wheel 110 and the rolling element 130. The inner wheel elastic ring 150 elastically transforms when a load is applied thereto from the outside like the earlier described outer wheel elastic is ring 140, thus increasing a contact area between the rolling element 130 and the outer wheel 120, thus effectively distributing the loads.

As shown in FIG. 4, the first inner wheel 110a and the second inner wheel 110b are separated like the inner wheel 110 and the outer wheel 120, and an inner wheel elastic ring 150 is inserted into between the first and second inner wheels 110a and 110b, and a space part 160' is formed between the first and second inner wheels 110a and 110b and the inner wheel elastic ring 150 for the inner wheel elastic ring 150 to be transformed by loads.

In the constructions comprising the engaging grooves 112a and 112b, the escape prevention shoulders 114a and 114b, the first and second boss parts 116a and 116b, the fixing hole 117a, the hook part 117b, the through hole 118b and the second engaging part 180, the detailed constructions of the first and second inner wheels 110a and 110b are same as the earlier described first and second outer wheels 120a and 120b except for the constructions that the first and second boss parts 116a and 116b and the escape prevention shoulders 114a and 114b have exchanged their positions thanks to the positions of the first and second inner wheels 110a and 110b in the interior of the bearing 100, so the detailed descriptions thereof will be omitted.

So far, the outer wheel elastic ring 140 and the inner wheel elastic ring 150 have been described to be employed in different embodiments; is however the outer wheel elastic ring 140 and the inner wheel elastic ring 150 can be concurrently installed.

FIGS. 5A and 6A and 6B are views illustrating the results of tests performed on the load distributions when a load (50 kg) is applied from the outside by 2D modeling the elastic ring bearing of the present invention and the conventional bearing. As shown in FIGS. 5A and 5B, in case that an outer wheel elastic ring 140 is installed between the outer wheel 120 and the rolling element 130, the distribution of the loads is wide, and as compared to when the number of the balls of the rolling element 130 coming into contact with the inner wheel 110 is five, the conventional bearing as shown in FIGS. 6A and 6B has features in the distribution of the bearing is focused on one point, which means that the number of the balls of the rolling element 130 coming into contact with the inner wheel 100 is actually one.

As shown in FIGS. 7 to 13, another embodiment of the present invention has features in that pluralities of inner and outer wheels, rolling elements and elastic members are connected in parallel for the purpose of distributing greater loads, so this embodiment of the present invention can be well applied for the sake of a large size system which has greater loads like a vehicle, a power generation facility, etc.

In details, the inner wheel 210 of the bearing 200, the outer wheel 220 installed at its outer side, and the rolling elements 230 installed between the inner wheel 210 and the outer wheel 220 are installed in multiple numbers, in other words, the upper and lower surfaces of the inner wheel 210 face each other, and the upper and lower surfaces of the outer wheel 220 face each other, and the inner wheel elastic ring 250 is installed between the inner wheel 210 and the rolling element 230 or the outer wheel elastic ring 240 is installed between the rolling element 230 and the outer wheel 220, so it becomes possible to distribute the loads with the aid of the transformations of the inner wheel and outer wheel elastic rings 250 and 240.

At this time, the inner wheel elastic ring 250 and the outer wheel elastic ring 240 may be all installed together like the earlier described embodiment of the present invention.

In more details, the another embodiment of the elastic ring bearing 200 of the present invention is featured to comprise the support part 270, the inner wheel 210, the rolling element 230, the inner wheel elastic ring 250, the outer wheel elastic ring 240, the outer wheel 220 and the fixing part 280, among which the support part 270 serves to prevent escapes as the inner wheel 210 is inserted onto its outer side and is formed of a center shaft 272, a first escape prevention cap 274 and a first fixing cap 276.

The center shaft 272 is formed in a hollow shape so that it can be engaged to a mechanical element where the elastic ring bearing 200 of the present invention is installed, and an inner wheel 210 is inserted onto its outer side, and a plurality of slits 272a are formed at both ends of the center shaft 272.

Here, the slits 272a serve to enable both ends of the center shaft 272 to be narrowed and widen by elastic force. In case that the inner wheel 210 is inserted onto an outer side of the center shaft 272, the inner wheel 210 can be more easily inserted by narrowing the width of the end portion of the center shaft 272. In a state that the inner wheel 210 is inserted onto an outer side of the center shaft, both ends of the center shaft 272 of which the width has been narrowed by the slits 272a are widened by elastic force for thereby supporting the inner surface of the inner wheel 210, which leads to a reliable engaged state.

The first escape prevention cap 274 is engaged at both ends of the center shaft 272 for thereby preventing the escapes of the inner wheel 210 inserted onto the center shaft 272 and the inner wheel elastic ring 250, and a through hole 274a is formed at the center of the first escape prevention cap 274.

When the first escape prevention cap 274 is engaged in a state that the width of both ends of the center shaft 272 with a plurality of slits 272a is narrowed, the both ends of the center shaft 272 are widened by elastic force, and the engaging shoulder 272b protruded outwardly gets caught by the upper side of the through hole 274a, so the first escape prevention cap 274 can remain engaged at the center shaft 272.

In addition, the first fixing cap 276 is positioned at an outer side of the first escape prevention cap 274 and is inserted onto both ends of the center shaft 272, so the first escape prevention cap 274 can be fixed at the center shaft 272.

Onto an outer surface of the center shaft 272 are sequentially inserted the inner wheel 210, the rolling element 230 and the outer wheel 220. As shown in FIG. 10, the inner wheel 210 and the outer wheel 220 engaged to an outer side of the inner wheel 210 are provided in multiple numbers in parallel with their upper and lower surfaces facing each other. The rolling element 230 formed of balls or rollers is positioned between the inner wheel 210 and the outer wheel 220.

The inner wheel elastic ring 250 made of an elastic material is to inserted into between the inner wheel 210 and the rolling element 230. The inner wheel elastic ring 250 transforms as the bearing 200 receives loads for thereby increasing the contact area between the rolling element 230 and the outer wheel 220, thus effectively distributing loads.

The inner wheel elastic ring 250 is transformed by the load occurring during the operation of the bearing 200, and the rolling element 230 is pressurized by the transformation. With the above mentioned pressurizing operations, the contact area between the rolling element 230 and the outer wheel 220 increases, thus distributing loads and reducing noises and vibrations occurring during the rotations.

As shown in FIG. 11, the first shoulder 212 is formed at the outer upper and lower surfaces of the inner wheel 210, and the first engaging groove 252 is formed at the upper and lower surfaces of the inner wheel elastic ring 250. The first shoulder part 212 is inserted into the inner side of the first engaging groove 252, so the inner wheel elastic ring 250 can be more reliably inserted into between the inner wheel 210 and the rolling element 230.

A first space part 260 is formed between the inner wheel 210 and the inner wheel elastic ring 250, namely, between the first shoulder 212 of the inner wheel 210 and the first engaging groove 252 of the inner wheel elastic ring 250 for thereby transforming the inner wheel elastic ring 250 with the aid of loads.

As shown in FIG. 9, the first space part 260 is formed in upward, downward, leftward and rightward directions of the outer side of the inner wheel 210 for the inner wheel elastic ring 250 to transform with respect to the load which applies in all directions including vertical and horizontal directions.

A first mounting groove 254 in which the rolling element 230 is is mounted is formed at an outer surface of the inner wheel elastic ring 250. The first mounting groove 254 serves to increase the contact area between the inner wheel elastic ring 250 and the rolling element 230, so that the transformation of the inner wheel elastic ring 250 due to the load applied from the outside can be well applied to the rolling element 230, thus enhancing the distribution effects of the loads.

The outer wheel elastic ring 240 is inserted into between the rolling element 230 and the outer wheel 20 and transforms like the inner wheel elastic ring 250 as it receives loads for thereby increasing the contact area between the rolling element 230 and the inner wheel 210, thus distributing loads.

The outer wheel elastic ring 240 is transformed by the loads occurring when in operation of the bearing 200 and pressurizes the rolling element 230, and the contact area between the rolling element 230 and the inner wheel 210 increases with the aid of the above mentioned pressurizing operation, thus distributing loads and reducing vibrations and noises.

As shown in FIG. 12, a second shoulder 222 is formed at the upper and lower surfaces of the inner side of the outer wheel 220, and a second engaging groove 242 into which the second shoulder 222 is inserted is formed at the upper and lower surfaces of the outer wheel elastic ring 240, and a second mounting groove 244 in which the rolling element 230 is mounted is is formed at an inner surface of the outer wheel elastic ring 240. A second space part 260' is formed between the outer wheel 220 and the outer wheel elastic ring 240, namely, between the second shoulder 222 of the outer wheel 220 and the second engaging groove 242 of the outer wheel elastic ring 240 for the purpose of transforming the outer wheel elastic ring 240 with the aid of the load which is applied from the outside.

The operations and effects of the second shoulder 222, the second engaging groove 242, the second mounting groove 244 and the second space part 260 are same as the operations and effects of the previously described inner wheel 210, the first shoulder 212, the first engaging groove 252, the first mounting groove 254 and the first space part 260 of the inner wheel elastic ring 250, so the detailed descriptions of the same will be omitted.

The fixing part 280 is engaged at an outer side of the outer wheel 220 and fixes the outer wheel 220 and the outer wheel elastic ring 240 to maintain a fixed state at the center shaft 272 and comprises the support member 282, the second escape prevention cap 284 and the second fixing cap 286.

In more details, the support member 282 is formed in a ring shape and is engaged at an outer side of the outer wheel 220 for thereby supporting the outer wheel 220. The second escape prevention cap 284 is inserted into both ends of the support member 282 for thereby preventing the escapes of the outer wheel 220 and the outer wheel elastic ring 240, and the second fixing cap 286 is engaged at an outer side of the second escape prevention cap 284 for thereby reliably securing the second escape prevention cap 284 at the support member 282.

The second escape prevention cap 284 comprises a plurality of slits 284a. When the second escape prevention cap 284 is inserted into both sides of the support member 282, in a state that the second escape prevention cap 284 is fixed, the second escape prevention cap 284 with the slits 284a are widened outwards with the aid of elastic force as the support member 282 is forced to move and is engaged in the directions of the slits 284a, so the support member 282 can be inserted into the inner side of the second escape prevention cap 284.

As shown in FIG. 13, the engaging groove 282a is formed at both ends of the outer circumferential surface of the support member 282, and the protrusion part 284b is protruded from an inner surface of the second escape prevention cap 284. In a state that the support member 282 is inserted into the inner side of the second escape prevention cap 284, the protrusion part 284b of the second escape prevention cap 284 is inserted into the engaging groove 282a of the support member 282, so the support member 282 and the second escape prevention cap 84 can remain engaged.

The second fixing cap 286 is installed at an outer side of the second escape prevention cap 284, so the second escape prevention cap 284 can be reliably secured at the outer side of the support member 282. A pressurizing part 286a made of an elastic material is formed at an outer end portion of the second fixing cap 286 for thereby pressurizing the outer surface of the second escape prevention cap 284, so the second escape prevention cap 284 can be reliably secured at the support member 282.

According to the elastic bearings 100 and 200 of the present invention, when a load is applied from the outside, the transformations of the elastic rings 140, 150, 240, 250 help increase the contact areas with the inner wheels 110 and 210 or the outer wheels 120 and 220 and the rolling elements 130 and 230, thus distributing the loads to the bearings 100 and 200, and with the aid of the distributions of the loads applied to the bearings 100 and 200, the noises and vibrations can be reduced, and the abrasions of the rolling elements 130 and 230 can be reduced, which results in the durability enhancements of the bearings 100 and 200.

As the present invention may be embodied in several forms without departing from the spirit or essential characteristics thereof, it should also be is understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

The present invention relates to an elastic ring bearing, and in particular to an elastic ring bearing which makes it possible to uniformly distribute a load applied to a bearing during rotations by inserting an elastic ring into a bearing generally used in various industrial equipments and a vehicle for thereby reducing noises and vibrations when in operations and enhancing durability.

What is claimed is:

1. A bearing comprising:
   an inner wheel;
   an outer wheel including
      a first outer wheel, and
      a second outer wheel;
   a plurality of rolling elements disposed between the inner wheel and the outer wheel;
   an outer wheel elastic ring disposed between the first outer wheel, the second outer wheel and the plurality of rolling elements;
   a first boss part disposed in an outer edge portion of the first outer wheel and having a plurality of fixing holes; and
   a second boss part disposed in an outer edge portion of the second outer wheel and having a plurality of hook parts, each one of the plurality of hook parts being inserted into corresponding one of the plurality of fixing holes.

2. The bearing of claim 1, a space part is formed between the outer wheel elastic ring and the first and second outer wheels.

3. The bearing of claim 1, wherein the first and second outer wheels form an engaging groove into which the outer wheel elastic ring is inserted and each of the first and second outer wheels has an escape prevention shoulder protruded from one side of the engaging groove.

4. The bearing of claim 1, further comprising a first engaging parts passing through one of the plurality of fixing holes and one of the plurality of hook parts, thereby securing the first outer wheel and the second outer wheel.

5. The bearing of claim 1, further comprising:
   an inner wheel elastic ring disposed between the inner wheel and the plurality of rolling elements.

6. The bearing of claim 5, wherein the inner wheel includes
   a first inner wheel, and
   a second inner wheel, and
   the inner wheel elastic ring is disposed between the first inner wheel and the second inner wheel.

7. A bearing comprising:
   a plurality of inner wheels arranged in parallel;
   a support part onto which the plurality of inner wheels are inserted and engaged;
   plurality sets of rolling elements, each set of the plurality sets of rolling elements being disposed in an outer side of each of the plurality of inner wheels;
   a plurality of inner wheel elastic rings, each of the plurality of inner wheel elastic rings being inserted between one of the plurality of inner wheels and one of the plurality sets of rolling elements while being positioned between neighboring two inner wheels of the plurality of inner wheels;

a plurality of outer wheels, each of the plurality of outer wheels being disposed in an outer side of said each set of the plurality sets of rolling elements;

a fixing part disposed in an outer side of the plurality of outer wheels and securing the plurality of outer wheels each other;

wherein said each of the plurality of inner wheels has a shoulder formed in a side thereof, and said each of the plurality of inner wheel elastic rings has a first engaging groove formed in a side thereof, the shoulder being inserted into the first engaging groove.

8. The bearing of claim 7, wherein said each of the plurality of inner wheel elastic rings has a mounting groove formed on an outer surface thereof for mounting said each set the plurality sets of rolling elements.

9. The bearing of claim 7, a space part is formed between said each of the plurality of inner wheels and said each of the plurality of inner wheel elastic rings.

10. The bearing of claim 7, wherein the support part comprises:

a center shaft onto which the plurality of inner wheels are inserted and engaged;

a escape prevention cap engaged on an end of the center shaft for preventing the plurality of inner wheels from escaping; and a fixing cap securing the escape prevention cap to the center shaft.

11. The bearing of claim 10, wherein the center shaft has a plurality of slits formed in both ends of the center shaft.

12. The bearing of claim 7, wherein the fixing part comprises:

a ring shaped support member disposed in an outer side of the plurality of outer wheels;

an escape prevention cap disposed in an end of the ring shaped support member and securing the plurality of outer wheels each other; and a fixing cap securing the escape prevention cap to the support part.

13. The bearing of claim 12, wherein the ring shaped support member includes an second engaging groove formed on an outer circumferential surface of the ring shaped support member, and the escape prevention cap includes a protrusion part formed in an inner surface of the escape prevention cap for engaging with the second engaging groove of the ring shaped support member.

14. A bearing, comprising:

a plurality of inner wheels arranged in parallel;

a support part onto which the plurality of inner wheels are inserted and engaged;

plurality sets of rolling elements, each set of the plurality sets of rolling elements being disposed in an outer side of each of the plurality of inner wheels;

a plurality of outer wheels, each of the plurality of outer wheels being disposed in an outer side of each set of the plurality sets of rolling elements;

a plurality of outer wheel elastic rings, each of the plurality of outer wheel elastic rings being inserted between said each set of the plurality sets of rolling elements and said each of the plurality of outer wheels while being positioned between neighboring two of the plurality of the outer wheels; and a fixing part disposed in an outer side of the plurality of outer wheels and securing the plurality of outer wheels each other, the fixing part including a ring shaped support member disposed in an outer side of the plurality of outer wheels, a fixing part escape prevention cap engaged to an end of the ring shaped support member for securing the plurality of outer wheels each other, and a fixing part fixing cap securing the fixing part escape prevention cap to the support part.

15. The bearing of claim 14, wherein said each of the plurality of outer wheels has a shoulder formed in a side of said each of the plurality of outer wheels, and said each of the plurality of outer wheel elastic rings has an engaging groove formed in a side of said each of the plurality of outer wheel elastic rings, the engaging groove being engaged to the shoulder.

16. The bearing of claim 15, wherein said each of the plurality of outer wheel elastic rings has a mounting groove formed on an inner surface thereof for mounting said each set of the plurality sets of rolling elements.

17. The bearing of claim 14, wherein a space part is formed between said each of the plurality of outer wheels and said each of the plurality of outer wheel elastic rings.

18. The bearing of claim 14, wherein the support part comprises:

a center shaft onto which the plurality of inner wheels are inserted and engaged;

a support part escape prevention cap engaged on an end of the center shaft for preventing said one of the plurality of inner wheels from escaping; and a support part fixing cap securing the support part escape prevention cap to the center shaft.

19. The bearing of claim 18, wherein the center shaft has a plurality of slits formed in both ends of the center shaft.

20. The bearing of claim 19, wherein the ring shaped support member includes an engaging groove formed on an outer circumferential surface of the ring shaped support member, and the fixing part escape prevention cap includes a protrusion part formed in an inner surface of the fixing part escape prevention cap for engaging with the engaging groove of the ring shaped support member.

* * * * *